Feb. 4, 1930.  G. C. VOIT  1,745,820
TRUCK EQUALIZER FOR STEAM SHOVELS AND THE LIKE
Filed Sept. 18, 1928  2 Sheets-Sheet 2
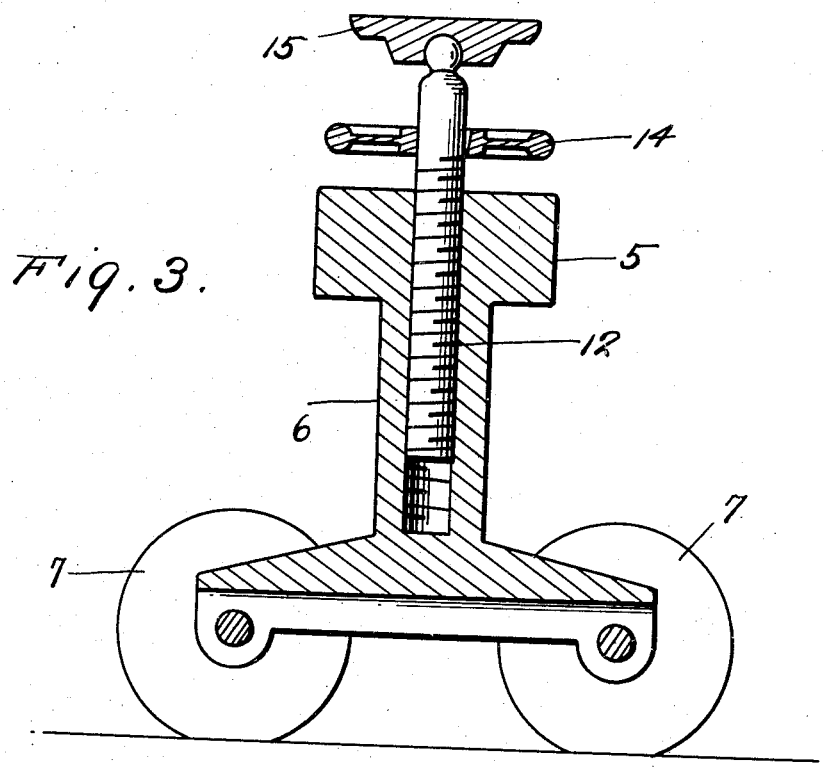
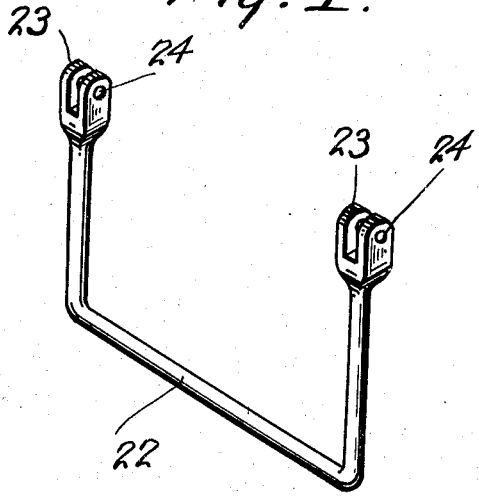
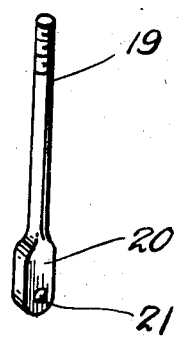
Inventor
Grover C. Voit
By *Clarence A. O'Brien*
Attorney Patented Feb. 4, 1930

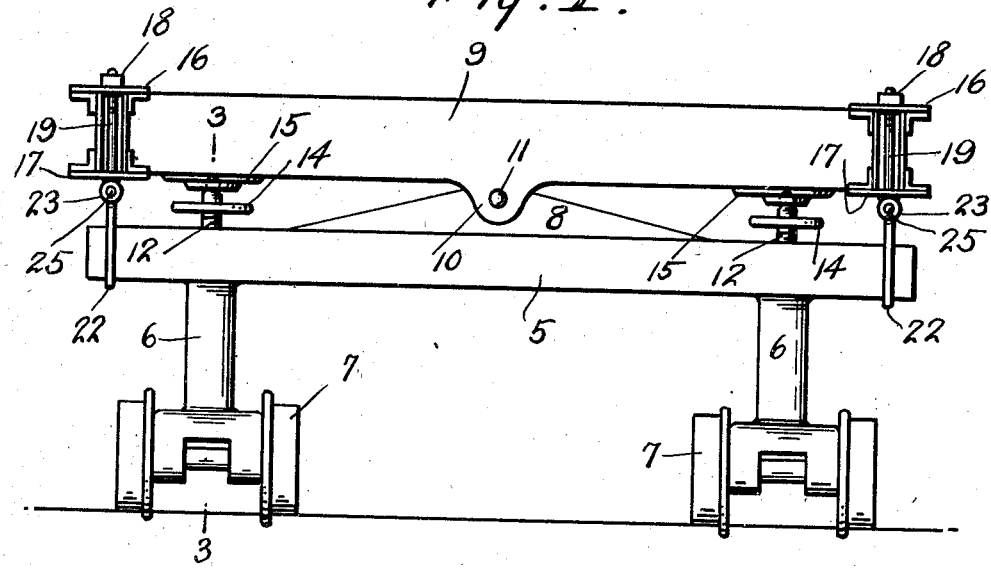
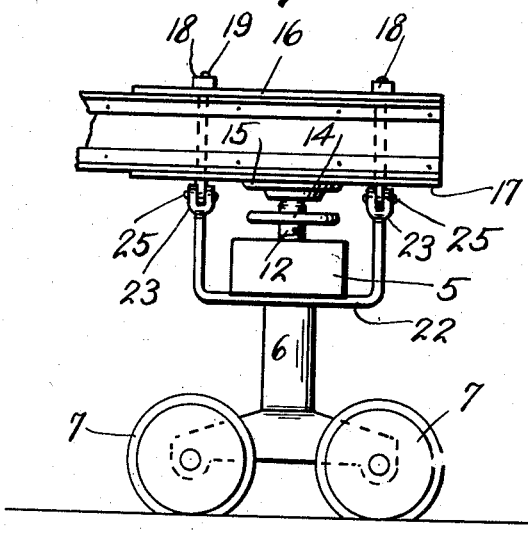

1,745,820

UNITED STATES PATENT OFFICE

GROVER C. VOIT, OF HOPEDALE, OHIO

TRUCK EQUALIZER FOR STEAM SHOVELS AND THE LIKE

Application filed September 18, 1928. Serial No. 306,625.

The present invention relates to an improved equalizer structure for the trucks of steam shovels and other like heavy mobile machinery, and has for its prime object to provide means whereby the equalizer may be locked against rocking movement for certain operations in the steam shovel machinery.

Another very important object of the invention resides in the provision of an improved structure of this nature which is exceedingly simple, strong and durable, and thoroughly efficient and reliable in use, besides being easy to manipulate.

With the above and numerous other objects in view, as will appear as the description proceeds, the invention resides in certain novel features of construction, and in the combination and arrangement of parts as will be hereinafter more fully described and claimed.

In the drawings:

Figure 1 is an elevation of an equalizer mechanism in conjunction with the truck, showing my improved apparatus thereon.

Figure 2 is a view taken at right angles to that shown in Figure 1.

Figure 3 is an enlarged detail section taken substantially on the line 3—3 of Figure 1.

Figure 4 is a perspective view of the U-shaped member.

Figure 5 is a perspective view of one of the bolts.

Referring to the drawings in detail, it will be seen that the truck herein disclosed includes a cross beam 5, on depending standard 6 rising from wheeled trucks 7 of conventional formation. A web 8 is provided on the cross beam 5, and a cross beam 9 is provided with ears 10 straddling the web 8 and pivoted thereto as at 11, so that the frame beam 9 is rockable on the truck beam 5, in the usual well known manner. In order to rock the truck beam 9, there is provided a threaded shank 12, in each standard operable by a hand wheel 14, and having a ball and socket connection 15, with the frame beam 9. All of the parts thus far described are conventional and well known in the art.

Referring now particularly to my improvements, it will be seen that an apparatus is mounted at each end, and includes clamp plates 16 and 17, the former above and the latter below the frame beam 9, and clamped thereto by bolts 19 and nuts 18. The lower ends of the bolts have flat heads 20 apertured as at 21. U-shaped members 22 have their ends bifurcated to receive therein the head 20. These bifurcated ends 23 are apertured as at 24, so that pins 25 may be inserted through the apertures 21 and will rockably mount the U-shaped members 22 on the bolt, so that these U-shaped members may be swung under the ends of the truck beam 5 to prevent any rocking of the frame bar 9. It will be seen that these apparatuses may be easily mounted in place and may be easily manipulated, so that the U-shaped members may engage with or disengage from the truck beam 5.

The construction, utility and advantages of this invention will now be quite apparent to those skilled in this art, without a more extensive description.

The present embodiment of the invention has been disclosed for the purposes of exemplification, but it is to be borne in mind that numerous changes in the details of construction, and in the combination and arrangement of parts may be resorted to, without departing from the spirit or scope of the invention as hereinafter claimed or sacrificing any of its advantages.

Having thus described my invention, what I claim as new is:

1. In combination, a truck cross beam, a frame cross beam, means rockably mounting the frame beam on the truck beam intermediate their ends, and means associated with the ends of the beams for preventing rocking of the frame beam with respect to the truck beam, said means comprising clamp structures to engage on the ends of the frame beams and U-shaped members pivotally mounted on the clamp structure to engage under the truck beam ends.

2. An apparatus of the class described including a pair of plates, bolts extending through the plates, nuts on the bolts, said bolts including flat heads having apertures, a U-shaped member having its ends bifurcated to straddle the heads, and having apertures registering with the apertures of the heads, and means extending through the apertures so that the U-shaped member is rockable on the bolt.

In testimony whereof I affix my signature.

GROVER C. VOIT.